US008160865B1

(12) United States Patent
Coughlan et al.

(10) Patent No.: US 8,160,865 B1
(45) Date of Patent: Apr. 17, 2012

(54) SYSTEMS AND METHODS FOR MANAGING COORDINATE GEOMETRY FOR A USER INTERFACE TEMPLATE

(75) Inventors: Martin Coughlan, Sandyford (IE); Janick Deregnieaux, Saint Cyprien (FR)

(73) Assignee: Symantec Corporation, Mountain View, CA (US)

( * ) Notice: Subject to any disclaimer, the term of this patent is extended or adjusted under 35 U.S.C. 154(b) by 605 days.

(21) Appl. No.: 12/352,022

(22) Filed: Jan. 12, 2009

(51) Int. Cl.
*G06F 17/28* (2006.01)
(52) U.S. Cl. ............... 704/4; 704/5; 704/7; 704/8; 704/9
(58) Field of Classification Search ............... 704/4–10
See application file for complete search history.

(56) References Cited

U.S. PATENT DOCUMENTS

| 6,425,123 | B1* | 7/2002 | Rojas et al. | 717/136 |
| 6,453,462 | B1* | 9/2002 | Meade et al. | 717/124 |
| 7,509,251 | B2* | 3/2009 | Andrews et al. | 704/8 |
| 2004/0122652 | A1* | 6/2004 | Andrews et al. | 704/2 |
| 2007/0169013 | A1* | 7/2007 | Bak et al. | 717/136 |
| 2008/0127103 | A1* | 5/2008 | Bak | 717/126 |

OTHER PUBLICATIONS

Website: http.www.alchemysoftware.ie/products/layout.html, Alchemy Layout Manager™—the new generation of localization intelligence, Feb. 12, 2009 (3 pgs.).
Website: http://java.sun.com/docs/books/tutorial/uiswing/layout/using.html, Using Layout Managers, Feb. 12, 2009 (6 pgs.).

* cited by examiner

*Primary Examiner* — Leonard Saint Cyr
(74) *Attorney, Agent, or Firm* — Holland & Hart LLP

(57) ABSTRACT

A method for managing coordinate geometry information for a user interface template to be applied to multiple languages is described. Strings of text in a file are translated from a first language to a pseudo language. Data field sizes associated with a first user interface are analyzed. The first user interface is in the first language. The data fields are resized to match strings of text sizes if the data field sizes of the data fields do not match strings of text sizes. A user interface template is stored with data field geometry information that indicates the data field sizes. Language specific data field geometry information is also stored that indicated the data field sizes.

20 Claims, 13 Drawing Sheets

SYSTEMS AND METHODS FOR MANAGING COORDINATE GEOMETRY FOR A USER INTERFACE TEMPLATE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems are used to carry out several business, industry, and academic endeavors.

A user of a computer system typically interacts with computer software running on the system via a user interface on a screen. The user interface may display controls to a user. The user may scroll over these controls on the screen via a mouse or keyboard and execute a command via the mouse or keyboard. The controls may be labeled in order to indicate to the user the type of control he/she is executing. For example, a control may be a rectangle-shaped box with the label "execute" on the box. The user may click on this control in order to execute a certain function of the software.

Computer software is used in various countries. In order to allow users in other countries to use the software, the software may be localized (i.e., translated) from one language to another. Using the above example, the word "execute" may be translated from English into the language used in the particular country in which the software is to be used. However, the translated words may be longer or shorter in length than the original word. As a result, a user interface with controls that are labeled with translated words may appear to be untidy or incomplete. For example, after being translated, the word "execute" may be longer or shorter than the English word "execute". The original sized control on the user interface may not be the correct size to properly display the translated word "execute" to the user. As such, benefits may be realized by providing systems and methods for generating user interface templates that may be used for multiple languages. In particular, benefits may be realized by providing system and methods for managing coordinate geometry for a user interface template that may be applied to multiple languages.

SUMMARY

A method for managing coordinate geometry information for a user interface template that is applied to multiple languages is described. Strings of text in a file may be translated from a first language to a pseudo language. Data field sizes associated with a first user interface may be analyzed. The first user interface may be in the first language. The data fields may be resized to match strings of text sizes, if the data field sizes do not match the strings of text sizes. A user interface template may be stored with data field geometry information that indicates the data field sizes. Data field geometry information for a specific language that indicates the data field sizes may also be stored.

In one embodiment, the pseudo language may be associated with one or more languages in a particular region. An indicator may be inserted at the beginning and end of each string of text in the pseudo language. In one aspect, characters of the strings of text in the first language may be replaced with characters associated with one or more languages in a particular region. The stored user interface template may be associated with a particular region.

In one embodiment, strings of text of a file may be translated from the first language into a second language. A stored user interface template associated with the second language may be accessed. The user interface template may include data field geometry information indicating the data field sizes in the user interface template. A user interface may be created in the second language from the user interface template. In one embodiment, the user interface in the second language includes data fields that are sized according to the data field geometry information. In one embodiment, the strings of text in the second language may be inserted into the data fields of the user interface in the second language. In one embodiment, one or more data fields in the user interface in the second language may be disconnected from the user interface template. The disconnected data fields may be resized according to the data field geometry information for a specific language.

A computer system configured to manage coordinate geometry information for a user interface template to be applied to multiple languages is also described. The computer system includes a processor and memory in electronic communication with the processor. The system may also include a mock translating module configured to translate strings of text in a file from a first language to a pseudo language, and an analysis module configured to analyze data field sizes associated with a first user interface. In one embodiment, the first user interface is in the first language. The computer system may further include a resizing module configured to resize the data fields to match strings of text sizes, if the data field sizes do not match the strings of text sizes, and a database configured to store a user interface template with data field geometry information that indicates the data field sizes and data field geometry information for a specific language that indicates the data field sizes.

A computer-program product for managing coordinate geometry information for a user interface template to be applied to multiple languages is also described. The computer-program product may include a computer-readable medium having instructions thereon. The instructions may include code programmed to translate strings of text in a file from a first language to a pseudo language, and code programmed to analyze data field sizes associated with a first user interface. The first user interface may be in the first language. The instructions may also include code programmed to resize the data fields to match strings of text sizes, if the data field sizes do not match the strings of text sizes, and code programmed to store a user interface template with data field geometry information that indicates the data field sizes and data field geometry information for a specific language that indicates the data field sizes.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
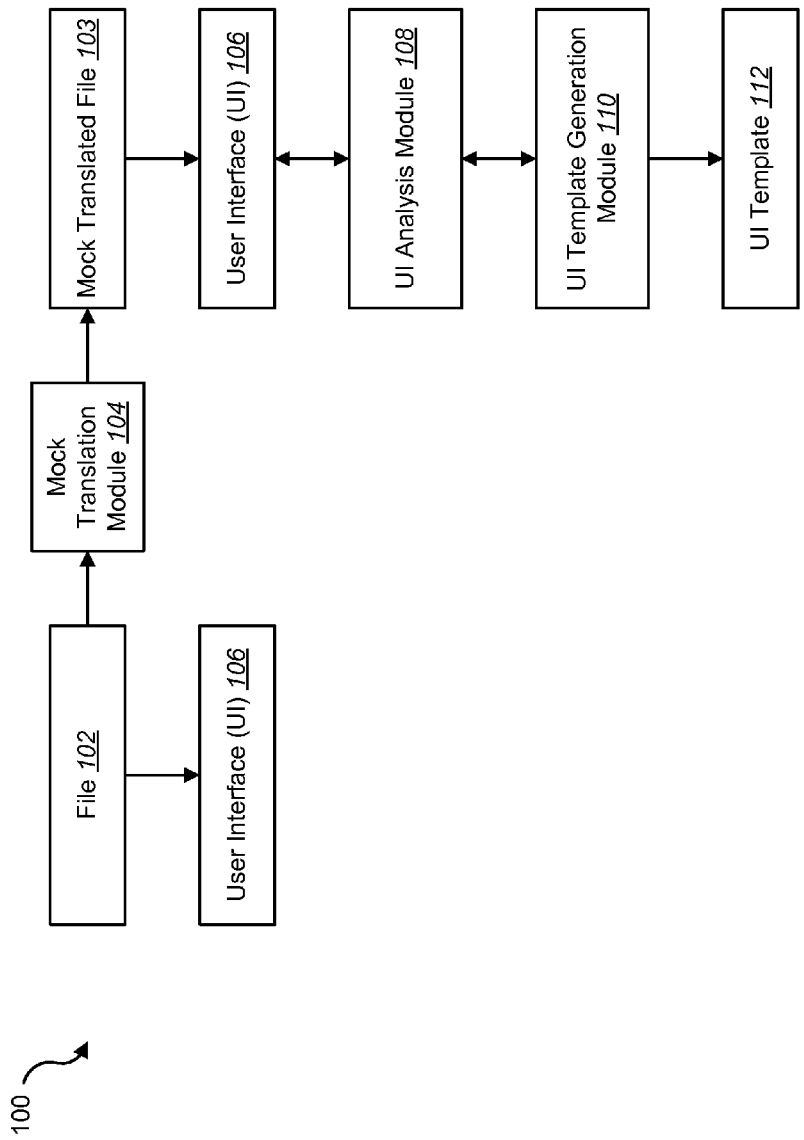
FIG. 1 is a block diagram illustrating one embodiment of a user interface (UI) template generation system.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

When translating text from one language to another, there is usually an average increase or decrease in the length of the translated string. For example, when translating from English to French, there may be an average increase in the length of the translated text of approximately 15%. When translating from English to Japanese, there may be an average decrease in the length of the translated text of approximately 10%. Resizing various controls of a user interface for each language can be a time-consuming task as software products are localized into an increasing number of languages. The present systems and methods describe the management of coordinate geometry information for software user interface templates that can be applied to multiple languages for localized software.

FIG. 1 is a block diagram illustrating one embodiment of a user interface (UI) template generation system 100. A UI template may be used with localized (i.e., translated) files. In one embodiment, the system 100 may include a file 102. A user may interact with various features of the file 102 via a UI 106. The UI 106 may include various data fields that comprise controls, commands, etc. for the user to execute. Data within the file 106 (such as text strings) may be placed within these data fields and displayed to the user via the UI 106. Each data field may display a text string of a particular length and size.

In one aspect, a mock translation module 104 may perform a pseudo translation of the file 102 to produce a mock translated file 103. For example, the mock translation module 104 may translate the text strings within the file 102 from a first language to a pseudo language. In one embodiment, the pseudo language may be associated with a particular language. In another embodiment, the pseudo language may be associated with a certain language group (e.g., Western European languages, Asian languages, etc.) The mock translated file 103 may be incorporated within the UI 106. In other words, the test strings in the pseudo language may be placed within the data fields of the UI 106.

In one embodiment, the system 100 may also include a UI analysis module 108. The analysis module 108 may analyze the data fields and text strings placed within the fields. The analysis module 108 may determine whether a particular text string (in the pseudo language) is too long or short for a certain data field. For example, if a text string in the pseudo language is too long for a particular data field, some characters of the string may not be displayed within the data field, because the data field can only contain a text string of a certain length. A UI template generation module 110 may generate a UI template 112 based upon the analysis provided by the analysis module 108. In one embodiment, the generation module 110 resizes certain data fields in accordance with the size of certain text strings in the pseudo language. In other words, some data fields in the UI template 112 may be resized to be longer or shorter than the data fields in the original UI 106.

Figure 2:
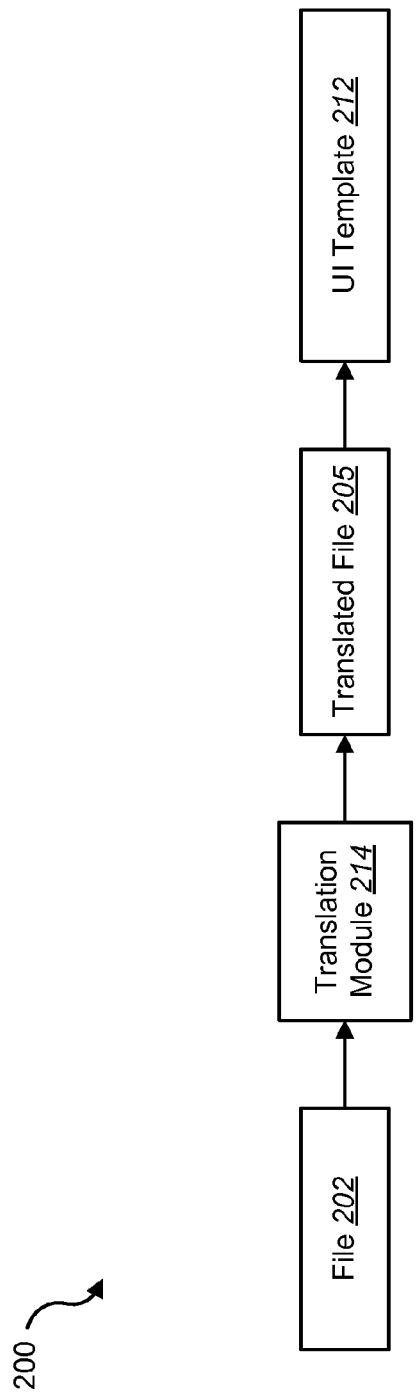
FIG. 2 is a block diagram illustrating one embodiment of a file localization system that uses a previously generated UI template to display the contents of a translated file.

FIG. 2 is a block diagram illustrating one embodiment of a file localization system 200 that uses a previously generated UI template 212 to display the contents of a translated file 205. In one embodiment, the contents (i.e., text strings) of a file 202 may be in a first language (such as English, for example). The contents of the file 202 may be displayed via a UI, such as the UI 106 illustrated in FIG. 1. A translation module 214 may translate the contents of the file 202 to a second language (such as French, for example). Translating the text strings from English to French may cause the text strings to increase or decrease in size. In one embodiment, the translated file 205 (with the increased or decreased text strings) may be displayed via the UI template 212. As previously explained, the data fields of the UI template 212 may have been resized to be longer or shorter than the data fields of the UI used to display the contents of the file 202 in the first language. The data fields of the UI template 212 may be resized in order to accommodate longer or shorter text strings that have been translated into the second language by the translation module 214.

Figure 3:
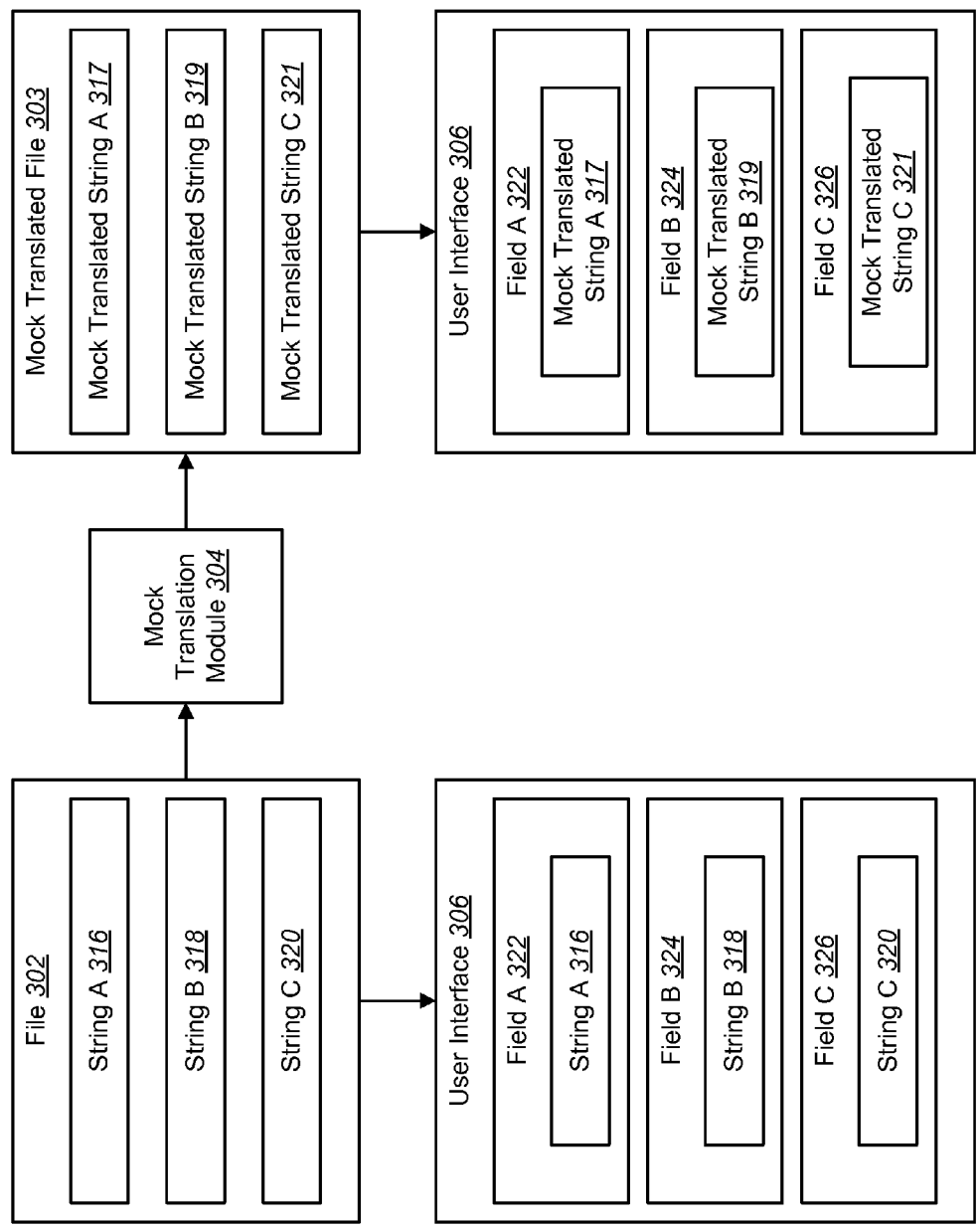
FIG. 3 is a block diagram illustrating a further embodiment of a file being displayed via a UI and a mock (i.e., pseudo) translated file being displayed via the UI.

FIG. 3 is a block diagram illustrating a further embodiment of a file 302 being displayed via a UI 306 and a mock (i.e., pseudo) translated file 303 being displayed via the UI 306. In one configuration, the file 302 includes one or more text strings. For example, the file 302 may include string A 316, string B 318, and string C 320. The file 302 may include more or less than the text strings illustrated in FIG. 3. The UI 306 may be used to display the contents of the file 302, such as the text strings 316, 318, 320. In one embodiment, the UI 306 includes one or more data fields, such as field A 322, field B 324, field C 326. Each of the data fields may include a text string. For example, string A 316 may be inserted in field A 322, string B 318 may be inserted in field B 324, and string C 320 may be inserted in field C 326.

In one embodiment, the fields 322, 324, 326 may be associated with various controls a user may execute via the UI 306. For example, string A 316 may be a text word of seven (7) characters, such as "Execute". The size of field A 322 may be set to hold seven characters. In addition, field A 322 may be positioned on the UI 306 to be associated with a control button. A user viewing the UI 306 may see a control button in the shape of a circle, rectangle, square, etc. The contents of field A 322 (such as string A 316) may be superimposed on top of, to the side of, below, etc. the control button. In one example, the user may see the control button on the UI 306 with the word "Execute" superimposed on top of the control button. The user may click on the control button via a user input device, such as a mouse, keyboard, pointer, etc.

In one embodiment, a mock translation module 304 may translate the file 302 from a first language to a mock translated file 303 in a pseudo language. For example, the mock translation module 304 may translate the text strings of the file to mock translated strings 317, 319, 321 in a pseudo language. The contents of the mock translated file 303 may be displayed via the UI 306. For example, mock translated string A 317 may be inserted in data field A 322, mock translated string B 319 may be inserted in data field B 324, and mock translated string C 321 may be inserted in data field C 326. The mock translated strings may be longer or shorter than the pre-mock translated strings. For example, mock translated string A 317 may be longer or shorter than string A 316. If mock translated string A 317 is longer than string A 316, portions of mock translated string A 317 may be truncated and may not be visible in field A 322. If mock translated string A 317 is shorter than string A 316, there will be extra space within data field A 322. As explained below, a determination may be made as to whether or not a data field needs to be resized because a mock translated string is too long or short for the particular data field.

Figure 4:
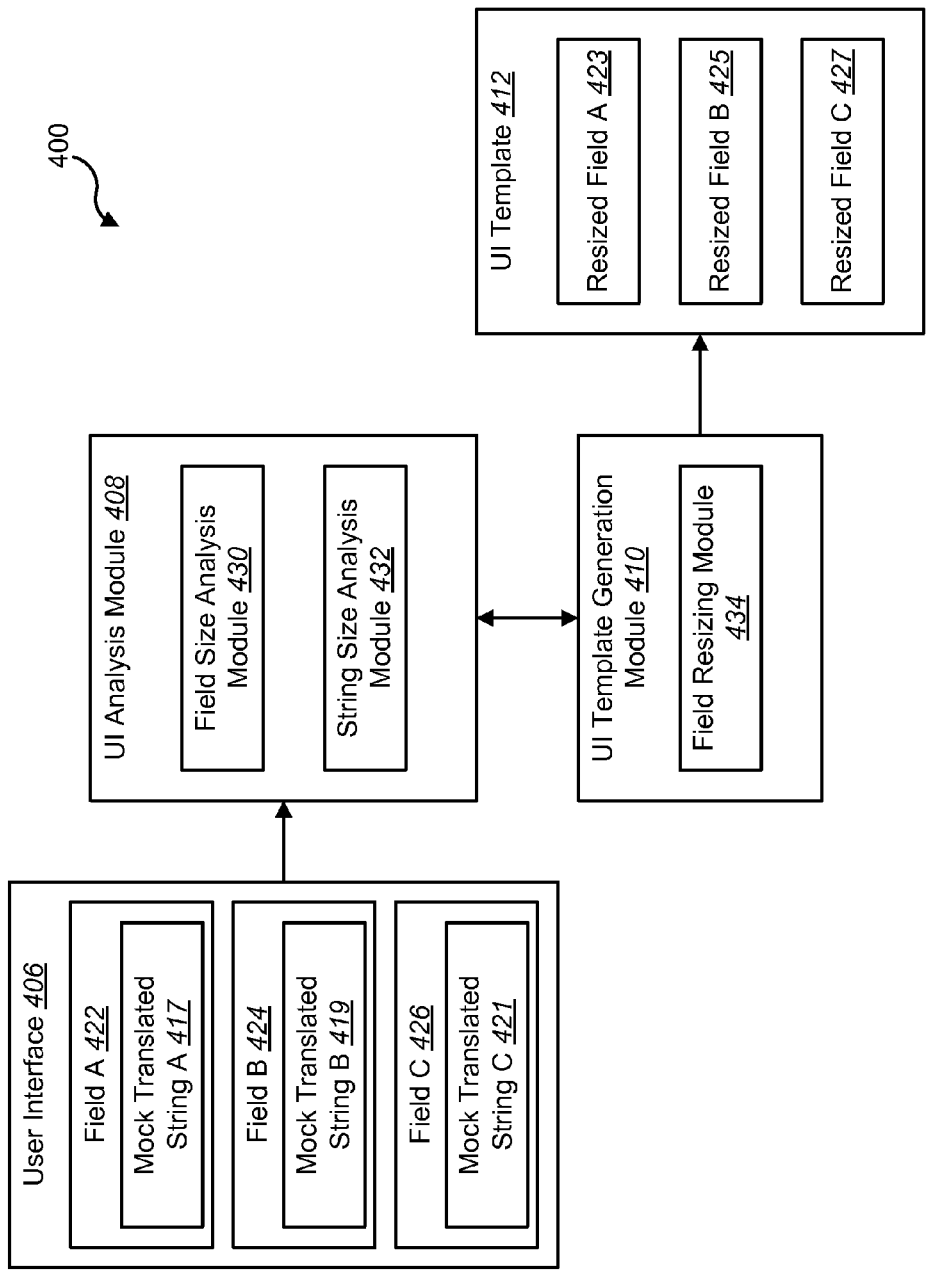
FIG. 4 is a block diagram illustrating a further embodiment of a UI template generation system.

FIG. 4 is a block diagram illustrating a further embodiment of a UI template generation system 400. In one configuration, a UI 406 may include various data fields 422, 424, 426. Each of the data fields may include a mock translated string 417, 419, 421 as previously explained. A UI analysis module 408 may analyze the UI 406 to determine whether one or more of the data fields 422, 424, 426 should be resized. For example, the analysis module 408 may include a field size analysis module 430 and a string size analysis module 432. The string size analysis module 432 may analyze the size of each of the mock translated strings 417, 419, 421, and the field size analysis module 430 may determine the size of string a particular data field can display. For example, the field size analysis module 430 may determine that field A 422 may display a text string of seven characters. However, the string size analysis module 432 may determine that mock translated string A 417 is a text string with twelve (12) characters. The analysis module 408 may log a "bug" associated with the length of field A 422 because field A 422 cannot display a complete mock translated string A 417 (i.e., five characters of mock translated string A 417 may be truncated).

In one embodiment, a UI template generation module 410 may analyze the bugs logged by the analysis module. The generation module 410 may include a field resizing module 434 that resizes one or more of the data fields of the UI. The resizing module 434 may resize the data fields that are associated with a bug logged by the analysis module. For example, the field resizing module 434 may resize data field A 422 by making field A 422 longer in length so that field A 422 can accommodate a string of twelve characters. In another example, the resizing module 410 may resize a data field by making the field shorter in length. The generation module 410 may generate a UI template 412 that includes resized data fields 423, 425, 427.

Figure 5:
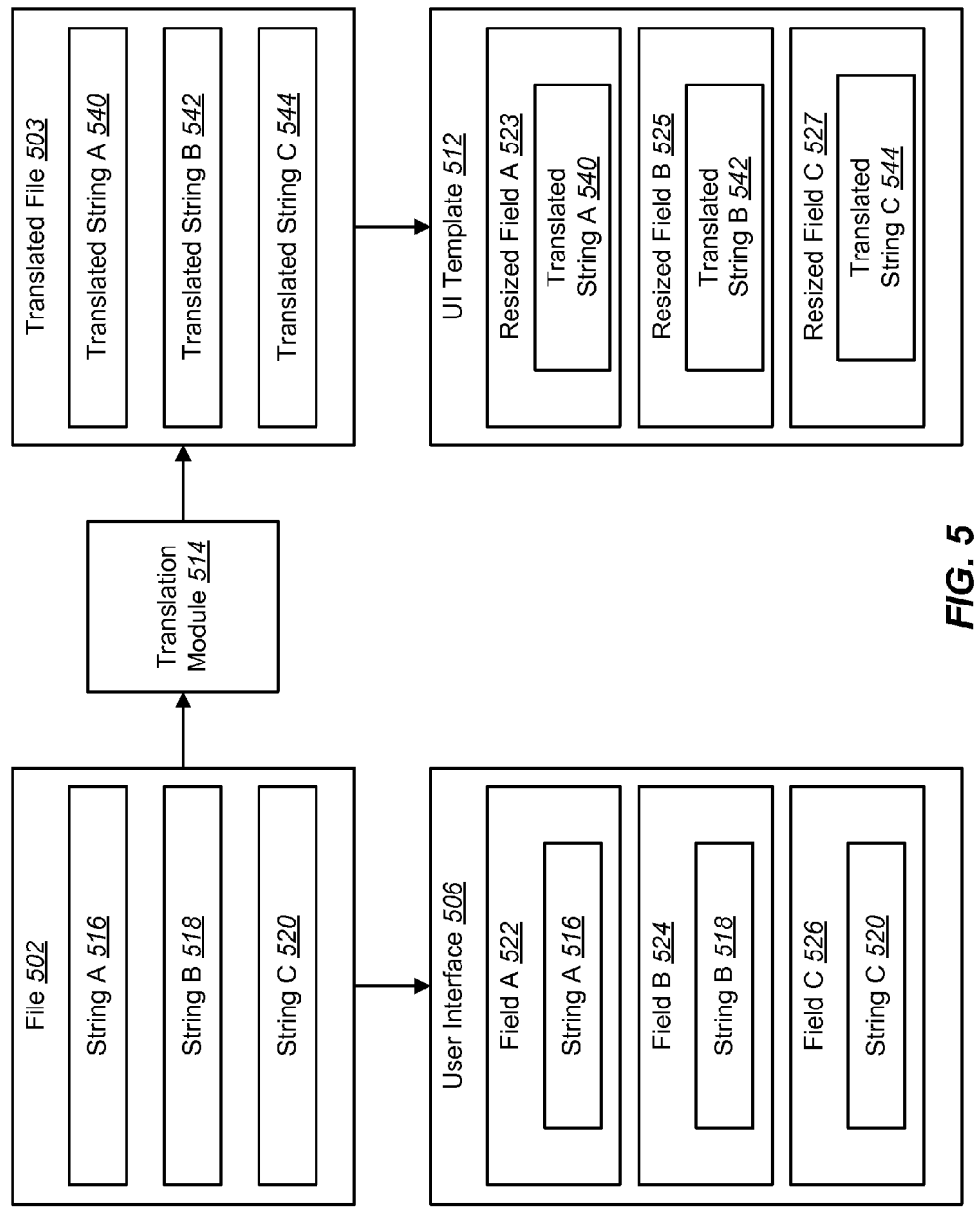
FIG. 5 is a block diagram illustrating one embodiment of displaying a localized file, such as translated file, via a UI template.

FIG. 5 is a block diagram illustrating one embodiment of displaying a localized file, such as translated file 503, via a UI template 512. In one embodiment, a file 502 includes a plurality of text strings 516, 518, 520 in a first language. A UI 506 may be used to display the contents of the file 503. For example, the UI 506 may include various data fields 522, 524, 526 in which the text strings 516, 518, 520 may be inserted.

In one embodiment, the contents of the file 502 may be translated into a second language by a translation module 514. The translated file 503 may include translated text strings 540, 542, 544. The translated strings 540, 542, 544 may be longer or shorter in length than the strings 516, 518, 520 in the first language. In one example, the UI template 512 may include resized data fields 523, 525, 527 to accommodate the translated strings 540, 542, 544. The UI template 512 may have been generated prior to the translation of the file 502. In addition, the UI template 512 may be accessed from a database (not shown). In one embodiment, the UI template 512 may include data fields that have been resized in accordance with the second language. For example, if the first language is English and the second language is French, the UI template 512 may include data fields that have been resized to be larger in size. However, if the first language is English and the second language is Japanese, the data fields may have been resized to be smaller in length compared to the length of the data fields 522, 524, 526 in the original UI 506.

Figure 6:
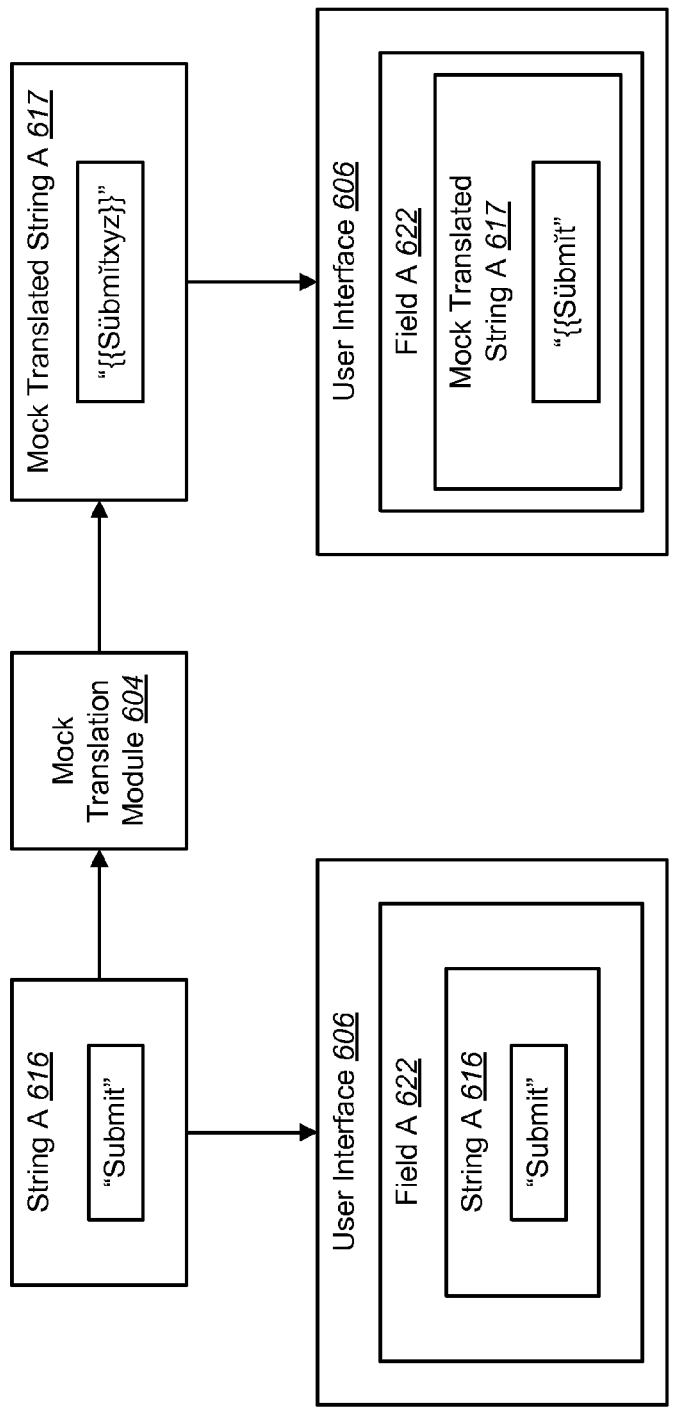
FIG. 6 is a block diagram illustrating one example of a pseudo translation of a text string.

FIG. 6 is a block diagram illustrating one example of a pseudo translation of a text string, such as string A 606. In one configuration, string A 616 is the word "submit". A UI 606 may include data field A 622 which displays string A 616. In other words, data field A 622 is able to display a string of six characters or less.

In one embodiment, a mock translation module 604 translates string A 616 into mock translated string A 617. The module 604 may translate string A 616 into a pseudo language. For example, the pseudo language may be associated with languages of Western Europe (e.g., French, Italian, German, etc.) In one example, each of the vowels of string A 616 may be replaced with vowels used with Western European languages. For example, the "u" character of "submit" may be replaced with a "ü" character. In addition, the "i" character may be replaced with a "ï" character. Further, additional characters may be added or characters may be deleted from string A 616 depending on the languages associated with the pseudo language. In one embodiment, if the mock translation module 604 translates string A 616 into a pseudo language associated with Western European languages, additional characters may be added to string A 616. For example, "submit" may be translated to "sübmïtxyz" because words in Western European languages may be, on average, 15% longer than words in English. In another embodiment, if the mock translation module 604 translates string A 616 into a pseudo language associated with Asian languages, characters may be deleted from string A 616 because words in Asian languages may be, on average, 10% shorter than words in English. In one configuration, indicators may be placed at the beginning and end of mock translated string A 617. For example, two curly braces ("{{") may be used to indicate the beginning and the end of the string.

In one embodiment, mock translated string A 617 may be inserted into field A 622 of the UI 606. In one example, mock translated string A 617 may be truncated because it is too long in length for data field A 622. In other words, the characters "xyz" may be truncated from mock translated string A 622. A user (such as a quality assurance engineer) or a software module (such as the UI analysis module 408) is able to determine that the mock translated string has been truncated because the closing indicators (i.e., "}}") are not present within the data field.

Figure 7:
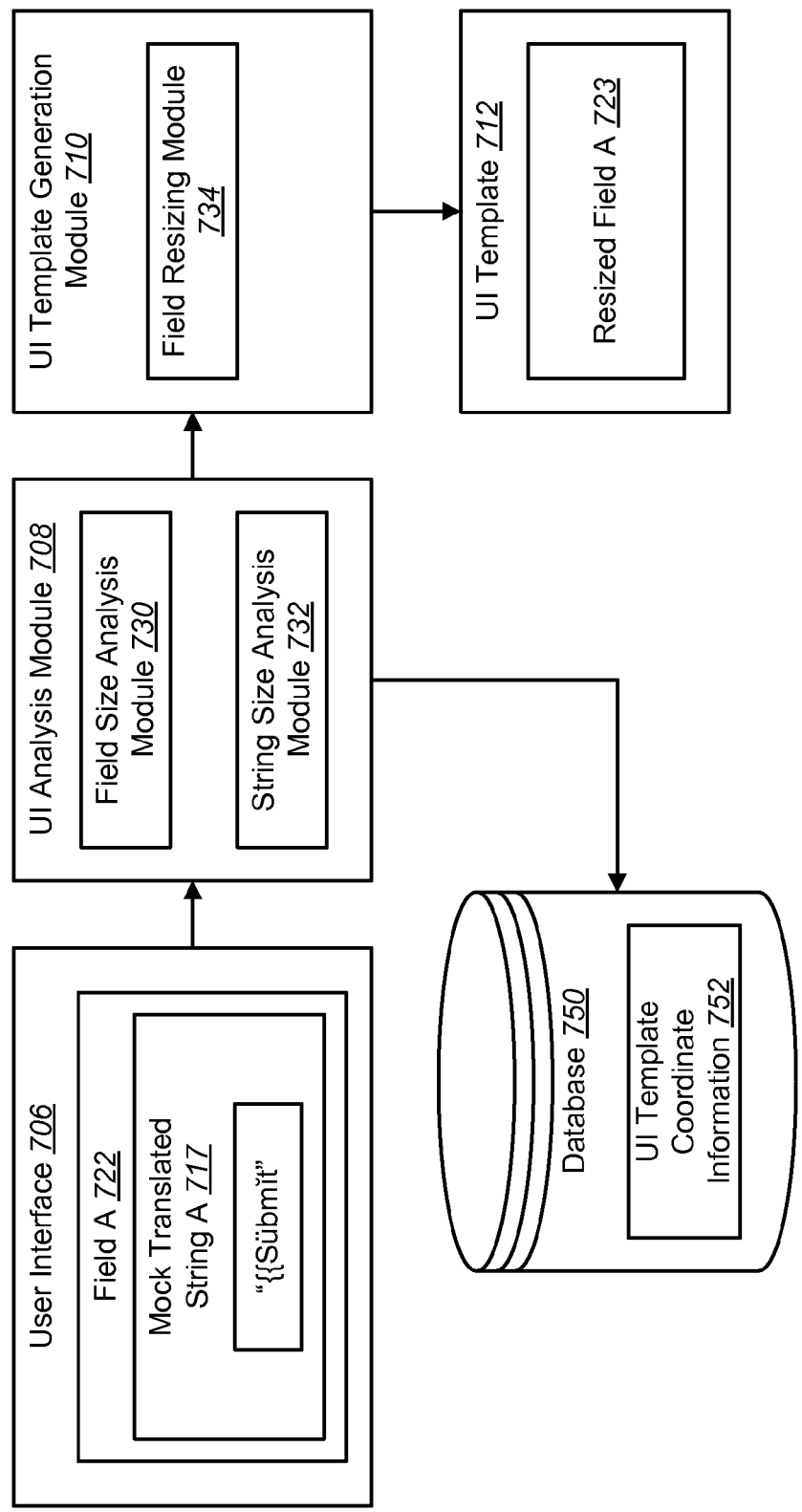
FIG. 7 is a block diagram illustrating a further embodiment of generating a UI template based on the analysis of a pseudo translation of a file.

FIG. 7 is a block diagram illustrating a further embodiment of generating a UI template 712 based on the analysis of a pseudo translation of a file. As previously explained in the above example, a UI 706 includes field A 722 which truncates part of mock translated string A 717. In one embodiment, a UI analysis module 708 analyzes the size of field A 722 to determine how many characters can be inserted in field A 722. A field size analysis module 730 may determine the size of the data field. In addition, a string size analysis module 732 may determine the length of mock translated string A 717. In this example, the field size analysis module 730 may determine that the current size of field A 722 is capable of displaying six characters or less. Further, the string size analysis module 732 may determine that the length of mock translated string A 717 is nine characters by locating the indicators that indicate the beginning and end of the string 717. The UI analysis module 708, in this example, may determine that field A 722 should be lengthened in order to accommodate nine characters.

In one example, a UI template generation module 710 generates a UI template 712 with resized data fields, such as resized data field A 723. In one embodiment, a field resizing module 734 resizes data field A 722 based on the results of the analysis module 708. The resized field A 723 may now be large enough to fully display each character of mock translated string A 717.

In a further embodiment, UI template coordinate information 752 that indicates the resizing information for the data fields associated with a particular language region may be stored in a database 750. For example, following the above example, the UI template coordinate information 752 may indicate that data fields used in user interfaces for Western European languages should be lengthened by 15% from the length of data fields used in user interfaces for the English language.

Figure 8:
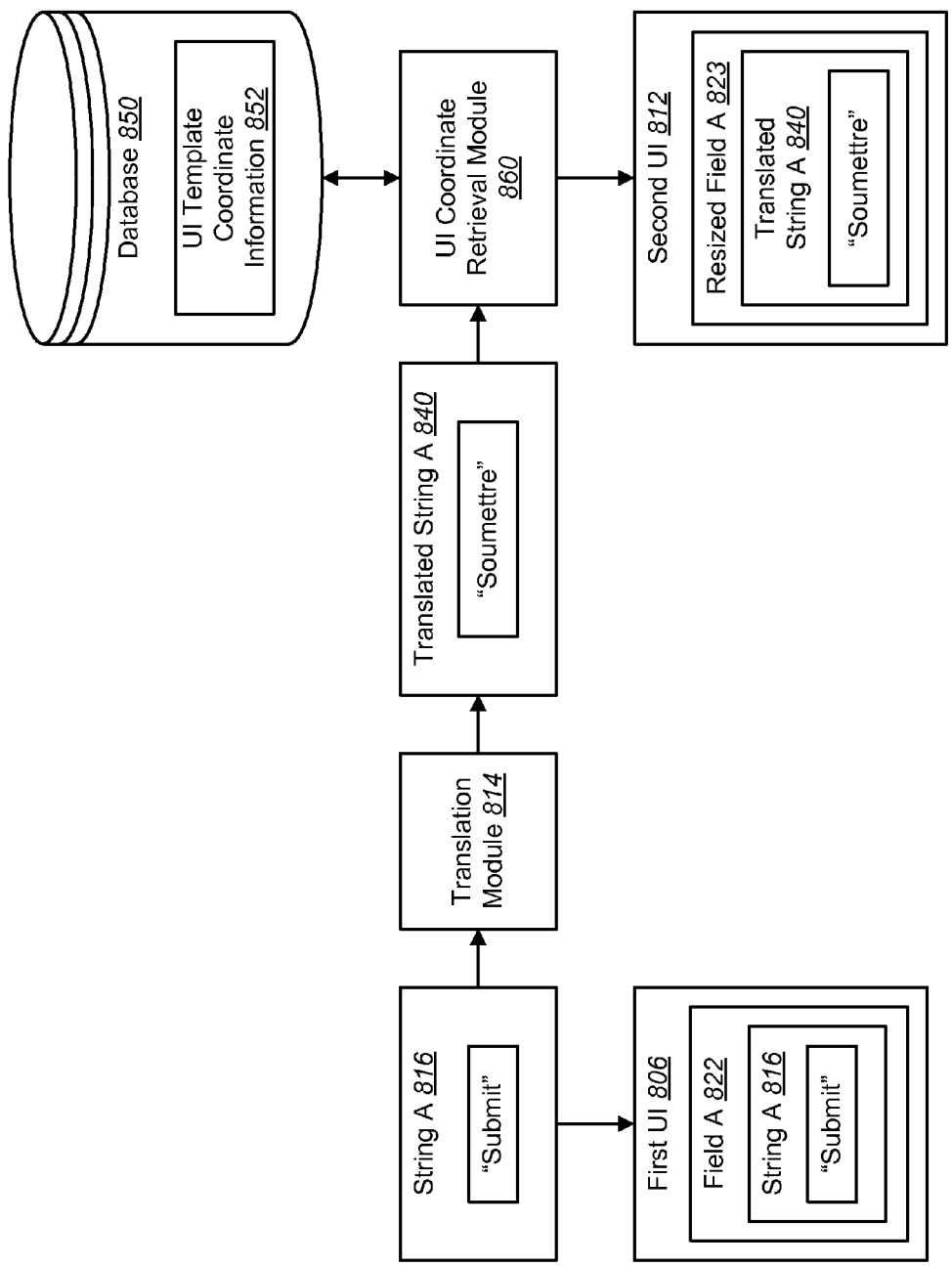
FIG. 8 is a block diagram illustrating one embodiment of generating a localized UI based on coordinate information from a UI template.

FIG. 8 is a block diagram illustrating one embodiment of generating a localized UI based on coordinate information from a UI template. Continuing with the above example, string A 816 may be the text word "submit". String A 816 may be displayed on a first UI 806. For example, string A 816 may be inserted into field A 822 that is able to display up to six characters.

In one embodiment, a translation module 814 may translate string A 816 from English to French to produce translated string A 840. The translated string may be the French word "soumettre". In one configuration, a UI coordinate retrieval module 860 may access a database 850 to retrieve UI template coordinate information 852. In one example, the retrieval module 860 retrieves coordinate information pertaining to a UI template that was generated for languages in Western Europe (e.g., French). The coordinate information 852 may indicate the size of the data fields in a UI. In one embodiment, a second UI 812 may be created that includes resized field A 823. Because coordinate information for Western Europe languages was retrieved, resized field A 823 be approximately 15% larger than the size of field A 822, which is used to display English text. In one embodiment, resized field A 823 is sufficiently large to display each of the characters of the French word "soumettre".

If the translation module 814 translates string A 816 into a language that typically produces smaller text strings (such as an Asian language), the retrieval module 860 may retrieve coordinate information 852 pertaining to the Asian languages. The coordinate information 852 may indicate that each data field in the second UI 812 should be resized to be small in length than the data fields in the first UI 806.

Figure 9:
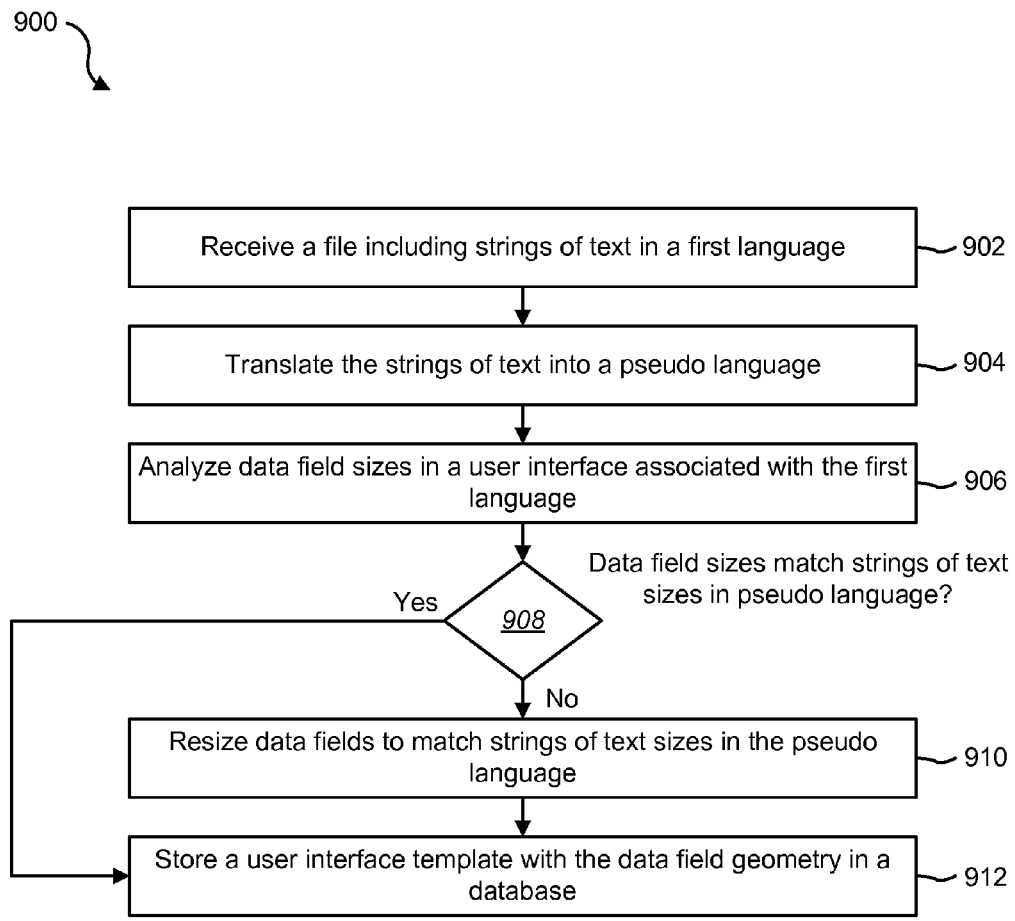
FIG. 9 is a flow diagram illustrating one embodiment of a method for generating coordinate geometry information for data fields in a UI template.

FIG. 9 is a flow diagram illustrating one embodiment of a method 900 for generating coordinate geometry information for data fields in a UI template. In one embodiment, a file is received 902 that includes strings of text in a first language. The strings of text may be translated 904 into a pseudo language. Data field sizes associated with a UI in the first language may be analyzed 906. In one embodiment, a determination 908 may be made as to whether or not the data field sizes match strings of text sizes in the pseudo language. If it is determined 908 that the data field sizes match the strings of text sizes, a UI template with the data field geometry (i.e., the data field sizes) may be stored 912 in a database.

However, if it is determined 908 that the data field sizes do not match the strings of text sizes, the data fields may be resized 910 in order to match the strings of text sizes. For example, the data fields may be increase or decreased in order to display longer or shorter strings of text. In one embodiment, a UI template with the data field geometry may be stored in the database 912. In this example, the data field geometry indicates the increase or decrease of the data fields. The stored UI template may also be associated with a particular language or region. For example, the stored UI template may be associated with "French", "German", "Italian", "Japanese", etc. In another embodiment, the UI template may be associated with a region such as Western Europe, Asia, etc.

Figure 10:
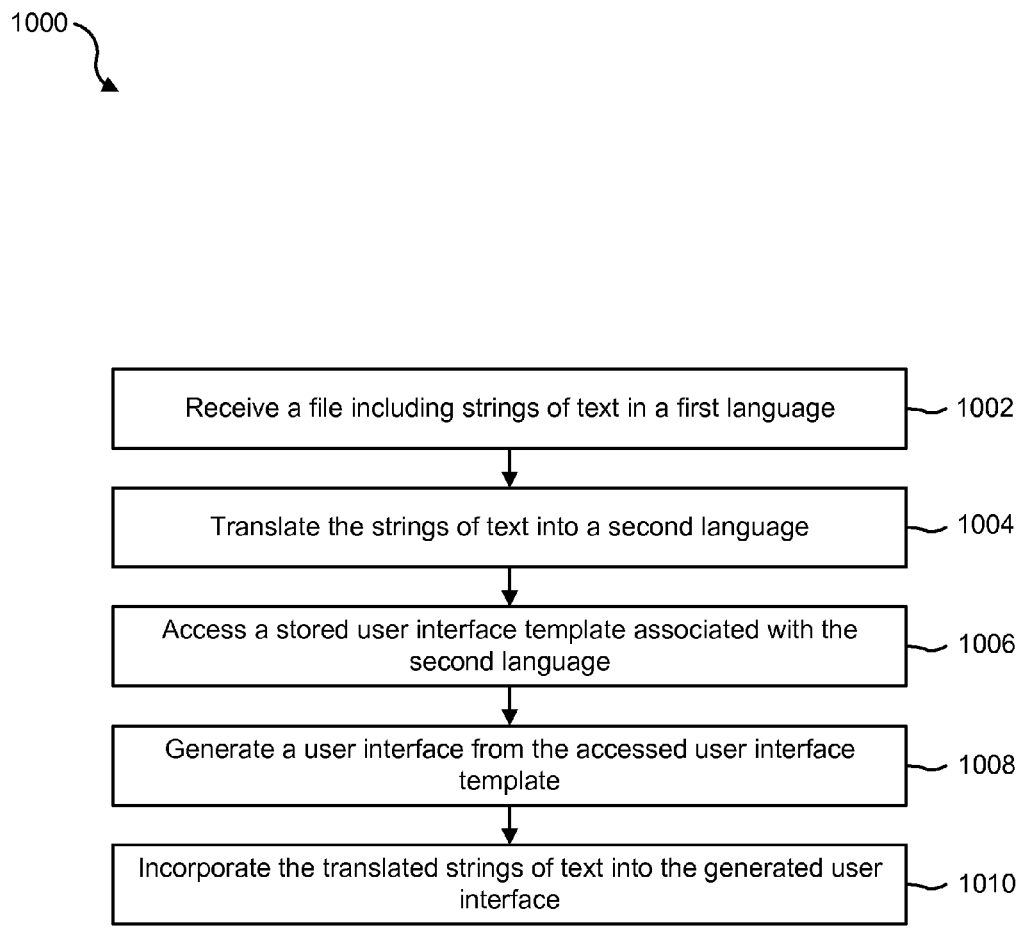
FIG. 10 is a flow diagram illustrating one embodiment of a method for accessing a previously generated UI template associated with a localized file.

FIG. 10 is a flow diagram illustrating one embodiment of a method 1000 for accessing a previously generated UI template associated with a localized file. In one embodiment, a file including strings of text in a first language is received 1002. The strings of text may be translated 1004 into a second language. A stored UI template associated with the second language may be accessed 1006. In one embodiment, the UI template is stored in a database. The stored UI template may be associated with the second language or a geographic region in which the second language is used. In one embodiment, the UI template includes coordinate geometry indicating the size of data fields in a UI for the second language.

In one embodiment, a UI may be generated 1008 that incorporates the coordinate geometry of the data fields form the UI template. In other words, the data fields of the generated UI may be sized according to the coordinate geometry of the UI template. In one embodiment, the translated strings of text may be incorporated 1010 into the data fields of the generated UI. A user may then view and interact with the localized file via the generated UI. In one embodiment, a user may incorporate 1010 all or part of the text strings into the generated UI. For example, the user may manually resize some of the data fields instead of using the resized data fields provided by the UI template.

Figure 11:
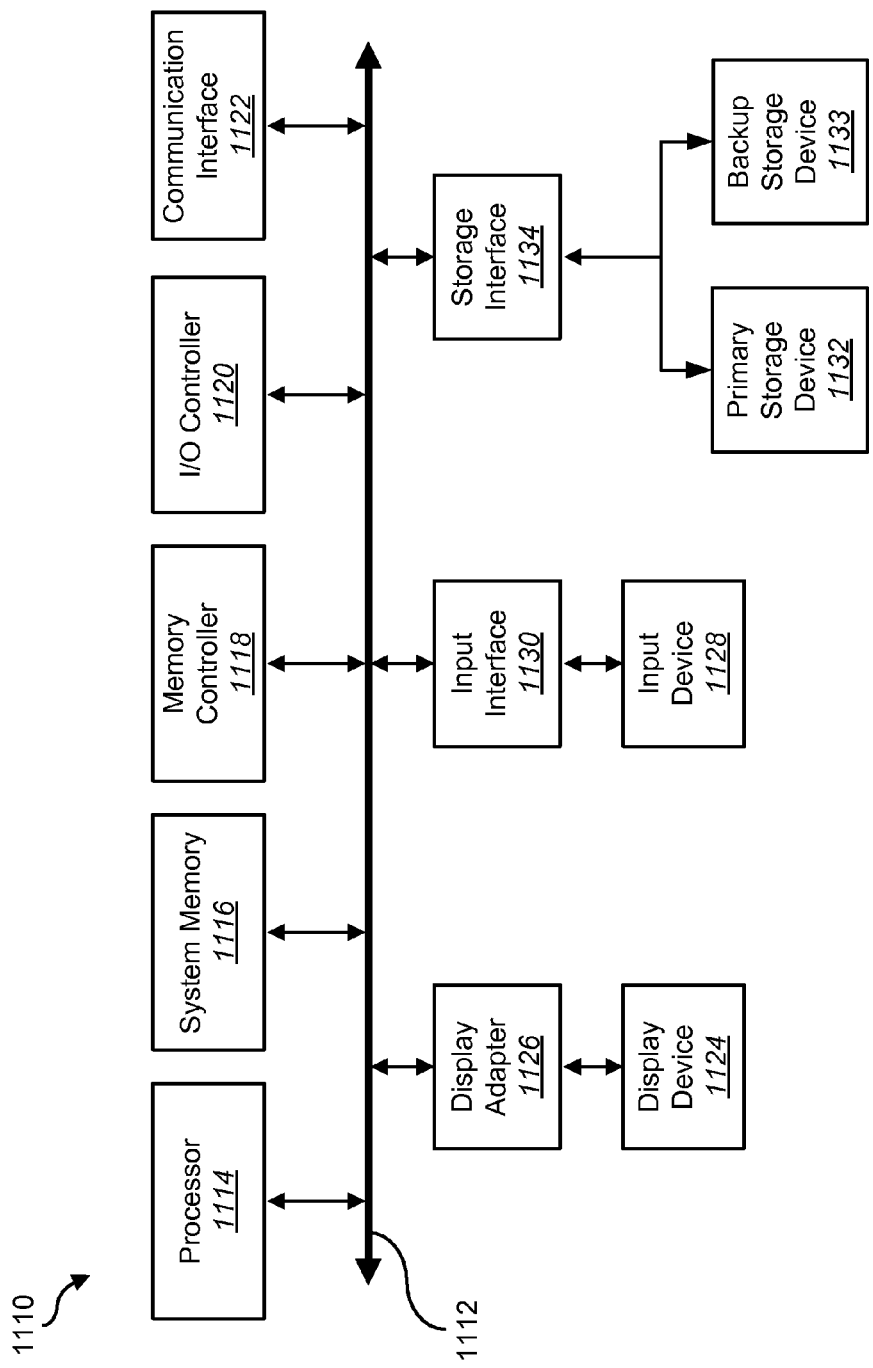
FIG. 11 is a block diagram of an exemplary computing system capable of implementing one or more of the embodiments described and/or illustrated herein.

FIG. 11 is a block diagram of an exemplary computing system 1110 capable of implementing one or more of the embodiments described and/or illustrated herein. Computing system 1110 broadly represents any single or multi-processor computing device or system capable of executing computer-readable instructions. Examples of computing system 1110 include, without limitation, workstations, laptops, client-side terminals, servers, distributed computing systems, handheld devices, or any other computing system or device. In its most basic configuration, computing system 1110 may comprise at least one processor 1114 and system memory 1116.

Processor 1114 generally represents any type or form of processing unit capable of processing data or interpreting and executing instructions. In certain embodiments, processor 1114 may receive instructions from a software application or module. These instructions may cause processor 1114 to perform the functions of one or more of the exemplary embodiments described and/or illustrated herein. For example, processor 1114 may perform and/or be a means for performing, either alone or in combination with other elements, one or more of the translating, analyzing, resizing, and storing steps described herein. Processor 1114 may also perform and/or be a means for performing any other steps, methods, or processes described and/or illustrated herein.

System memory 1116 generally represents any type or form of volatile or non-volatile storage device or medium capable of storing data and/or other computer-readable instructions. Examples of system memory 1116 include, without limitation, random access memory (RAM), read only memory (ROM), flash memory, or any other suitable memory device. Although not required, in certain embodiments computing system 1110 may comprise both a volatile memory unit (such as, for example, system memory 1116) and a non-volatile storage device (such as, for example, primary storage device 1132, as described in detail below).

In certain embodiments, exemplary computing system 1110 may also comprise one or more components or elements in addition to processor 1114 and system memory 1116. For example, as illustrated in FIG. 11, computing system 1110 may comprise a memory controller 1118, an Input/Output (I/O) controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an ISA, PCI, PCIe, or similar bus) and a network.

Memory controller 1118 generally represents any type or form of device capable of handling memory or data or controlling communication between one or more components of computing system 1110. For example, in certain embodiments memory controller 1118 may control communication between processor 1114, system memory 1116, and I/O controller 1120 via communication infrastructure 1112. In certain embodiments, memory controller 1118 may perform and/or be a means for performing, either alone or in combination with other elements, one or more of the steps or features described and/or illustrated herein, such as translating, analyzing, resizing, and storing.

I/O controller 1120 generally represents any type or form of module capable of coordinating and/or controlling the input and output functions of a computing device. For example, in certain embodiments I/O controller 1120 may control or facilitate transfer of data between one or more elements of computing system 1110, such as processor 1114, system memory 1116, communication interface 1122, display adapter 1126, input interface 1130, and storage interface 1134. I/O controller 1120 may be used, for example, to perform and/or be a means for translating, analyzing, resizing, and storing steps described herein. I/O controller 1120 may also be used to perform and/or be a means for performing other steps and features set forth in the instant disclosure.

Communication interface 1122 broadly represents any type or form of communication device or adapter capable of facilitating communication between exemplary computing system 1110 and one or more additional devices. For example, in certain embodiments communication interface 1122 may facilitate communication between computing system 1110 and a private or public network comprising additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 1122 may also allow computing system 1110 to engage in distributed or remote computing. For example, communication interface 1122 may receive instructions from a remote device or send instructions to a remote device for execution. In certain embodiments, communication interface 1122 may perform and/or be a means for performing, either alone or in combination with other elements, one or more of the translating, analyzing, resizing, and storing steps disclosed herein. Communication interface 1122 may also be used to perform and/or be a means for performing other steps and features set forth in the instant disclosure.

As illustrated in FIG. 11, computing system 1110 may also comprise at least one display device 1124 coupled to communication infrastructure 1112 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer, as known in the art) for display on display device 1124.

As illustrated in FIG. 11, exemplary computing system 1110 may also comprise at least one input device 1128 coupled to communication infrastructure 1112 via an input interface 1130. Input device 1128 generally represents any type or form of input device capable of providing input, either computer or human generated, to exemplary computing system 1110. Examples of input device 1128 include, without limitation, a keyboard, a pointing device, a speech recognition device, or any other input device. In at least one embodiment, input device 1128 may perform and/or be a means for performing, either alone or in combination with other elements, one or more of the translating, analyzing, resizing, and storing steps disclosed herein. Input device 1128 may also be used to perform and/or be a means for performing other steps and features set forth in the instant disclosure.

As illustrated in FIG. 11, exemplary computing system 1110 may also comprise a primary storage device 1132 and a backup storage device 1133 coupled to communication infrastructure 1112 via a storage interface 1134. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a floppy disk drive, a magnetic tape drive, an optical disk drive, a flash drive, or the like. Storage interface 1134 generally represents any type or form of interface or device for transferring data between storage devices 1132 and 1133 and other components of computing system 1110.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also comprise other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

Storage devices 1132 and 1133 may also be used, for example, to perform and/or be a means for performing, either alone or in combination with other elements, one or more of the translating, analyzing, resizing, and storing steps disclosed herein. Storage devices 1132 and 1133 may also be used to perform and/or be a means for performing other steps and features set forth in the instant disclosure.

Many other devices or subsystems may be connected to computing system 1110. Conversely, all of the components and devices illustrated in FIG. 11 need not be present to practice the embodiments described and/or illustrated herein. The devices and subsystems referenced above may also be interconnected in different ways from that shown in FIG. 11. Computing system 1110 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1110. All or a portion of the computer program stored on the computer-readable medium may then be stored in system memory 1116 and/or various portions of storage devices 1132 and 1133. When executed by processor 1114, a computer program loaded into computing system 1110 may cause processor 1114 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1110 may be configured as an application specific integrated circuit (ASIC) adapted to implement one or more of the exemplary embodiments disclosed herein.

Figure 12:
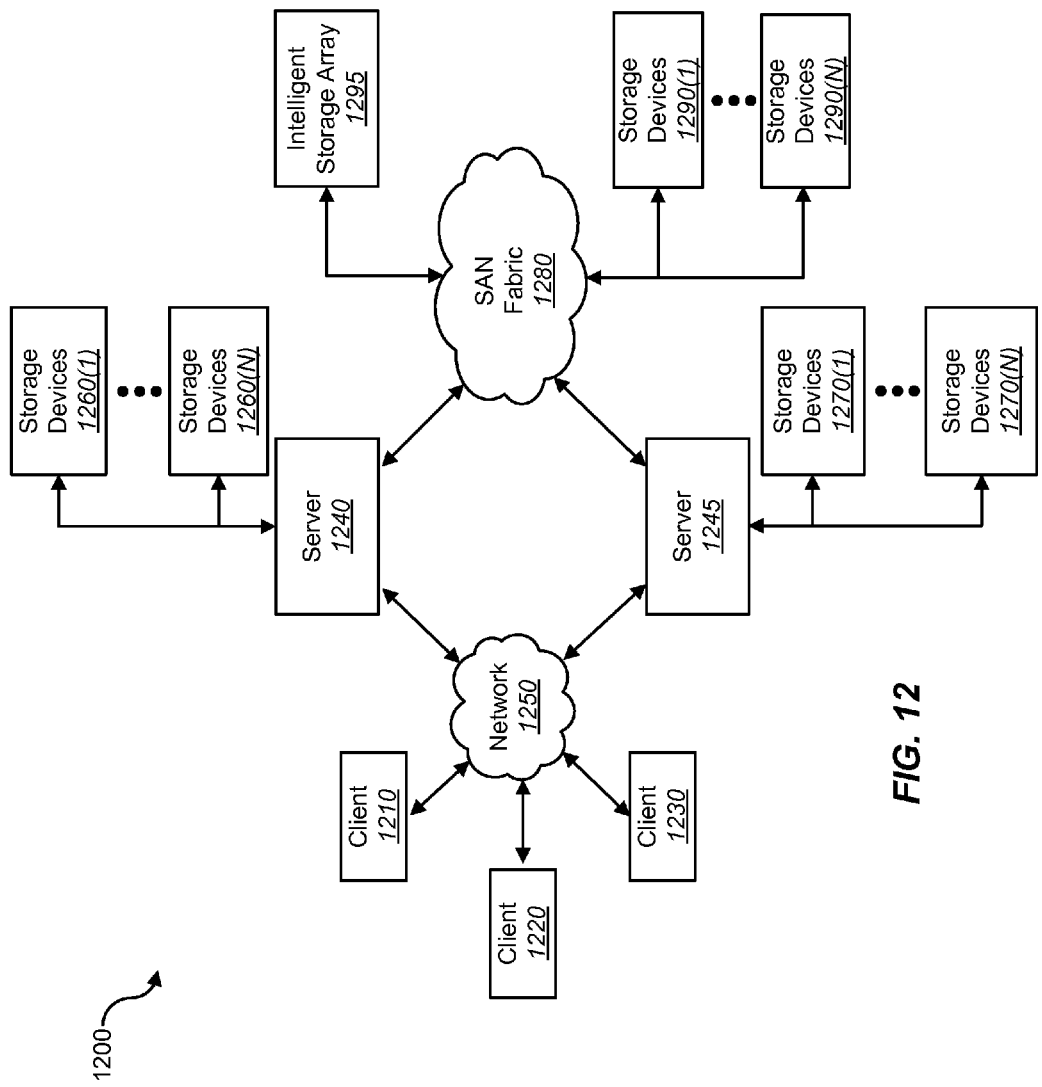
FIG. 12 is a block diagram of an exemplary network architecture in which client systems and servers may be coupled to a network.

FIG. 12 is a block diagram of an exemplary network architecture 1200 in which client systems 1210, 1220, and 1230 and servers 1240 and 1245 may be coupled to a network 1250. Client systems 1210, 1220, and 1230 generally represent any type or form of computing device or system, such as exemplary computing system 1110 in FIG. 11. Similarly, servers 1240 and 1245 generally represent computing devices or systems, such as application servers or database servers, configured to provide various database services and/or to run certain software applications. Network 1250 generally represents any telecommunication or computer network; including, for example, an intranet, a wide area network (WAN), a local area network (LAN), a personal area network (PAN), or the Internet.

As illustrated in FIG. 12, one or more storage devices 1260(1)-(N) may be directly attached to server 1240. Similarly, one or more storage devices 1270(1)-(N) may be directly attached to server 1245. Storage devices 1260(1)-(N) and storage devices 1270(1)-(N) generally represent any type or form of storage device or medium capable of storing data and/or other computer-readable instructions. In certain embodiments, storage devices 1260(1)-(N) and storage devices 1270(1)-(N) may represent network-attached storage (NAS) devices configured to communicate with servers 1240 and 1245 using various protocols, such as NFS, SMB, or CIFS.

Servers 1240 and 1245 may also be connected to a storage area network (SAN) fabric 1280. SAN fabric 1280 generally represents any type or form of computer network or architecture capable of facilitating communication between a plurality of storage devices. SAN fabric 1280 may facilitate communication between servers 1240 and 1245 and a plurality of storage devices 1290(1)-(N) and/or an intelligent storage array 1295. SAN fabric 1280 may also facilitate, via network 1250 and servers 1240 and 1245, communication between client systems 1210, 1220, and 1230 and storage devices 1290(1)-(N) and/or intelligent storage array 1295 in such a manner that devices 1290(1)-(N) and array 1295 appear as locally attached devices to client systems 1210, 1220, and 1230. As with storage devices 1260(1)-(N) and storage devices 1270(1)-(N), storage devices 1290(1)-(N) and intelligent storage array 1295 generally represent any type or form of storage device or medium capable of storing data and/or other computer-readable instructions.

In certain embodiments, and with reference to exemplary computing system 1110 of FIG. 11, a communication interface, such as communication interface 1122 in FIG. 11, may be used to provide connectivity between each client system 1210, 1220, and 1230 and network 1250. Client systems 1210, 1220, and 1230 may be able to access information on server 1240 or 1245 using, for example, a web browser or other client software. Such software may allow client systems 1210, 1220, and 1230 to access data hosted by server 1240, server 1245, storage devices 1260(1)-(N), storage devices 1270(1)-(N), storage devices 1290(1)-(N), or intelligent storage array 1295. Although FIG. 12 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1240, server 1245, storage devices 1260(1)-(N), storage devices 1270(1)-(N), storage devices 1290(1)-(N), intelligent storage array 1295, or any combination thereof. All or a portion of one or more of the exemplary embodiments disclosed herein may also be encoded as a computer program, stored in server 1240, run by server 1245, and distributed to client systems 1210, 1220, and 1230 over network 1250. Accordingly, network architecture 1200 may perform and/or be a means for performing, either alone or in combination with other elements, one or more of the translating, analyzing, resizing, and storing steps disclosed herein. Network architecture 1200 may also be used to perform and/or be a means for performing other steps and features set forth in the instant disclosure.

As detailed above, computing system 1110 and/or one or more of the components of network architecture 1200 may perform and/or be a means for performing, either alone or in combination with other elements, one or more steps of the exemplary methods described and/or illustrated herein. For example, computing system 1110 and/or one or more of the components of network architecture 1200 may perform and/or be a means for performing a computer-implemented method for maintaining file-type information for a file that may comprise: 1) translating strings of text in a file from a first language to a pseudo language, 2) analyzing data field sizes associated with a first user interface, wherein the first user interface is in the first language, 3) resizing the data fields to match strings of text sizes if the data field sizes do not match the strings of text sizes, and 4) storing a user interface template with data field geometry information that indicates the data field sizes and data field geometry information for a specific language that indicates the data field sizes.

Figure 13:
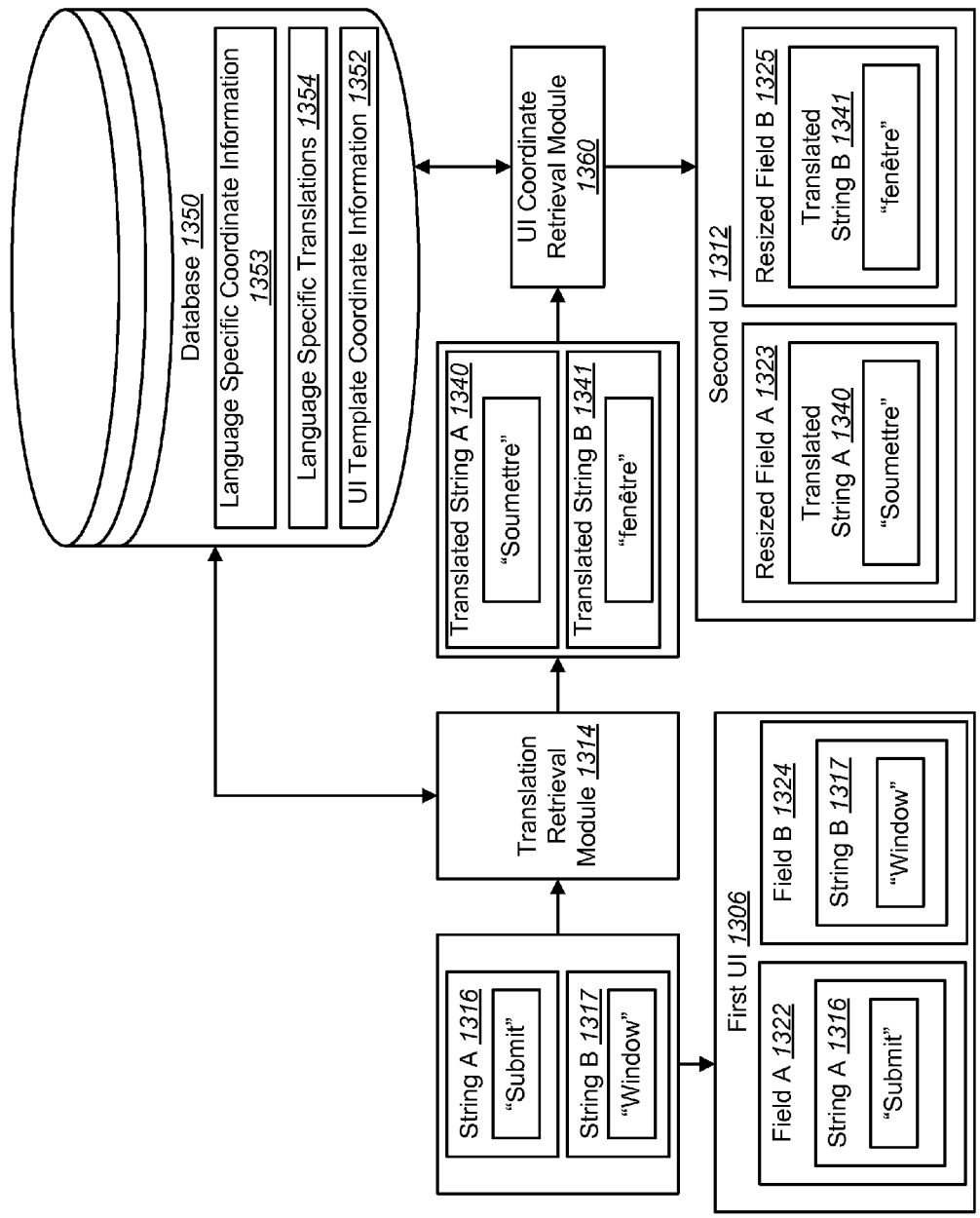
FIG. 13 is a block diagram illustrating another embodiment of generating a localized UI based on language specific coordinate information and coordinate information from a UI template.

FIG. 13 is a block diagram illustrating another embodiment of generating a localized UI based on language specific coordinate information and/or coordinate information from a UI template. A database 1350 may include language specific translations 1354 of various words. In addition, the database 1350 may include language specific coordinate information 1353 and UI template coordinate information 1352 that may be used to resize one or more fields on a UI.

In one embodiment, string A 1316 may be the word "submit" and string B 1317 may be the word "window". A first UI 1306 may display field A 1322 which includes string A 1316. In addition, the first UI 1306 may also display field B 1324, which includes string B 1317. In one embodiment, a translation retrieval module 1314 may access the language specific translations 1354 in the database 1350 for string A 1316 and string B 1317. For example, the translation retrieval module 1314 may retrieve the French translation of the words "submit" and "window" (i.e., "soumettre" and "fenetre", respectively). The translation retrieval module 1314 may retrieve translations of string A 1316 and string B 1317 in languages other than French, such as, for example, Italian, German, Spanish, etc. Each of these translations in the various languages may be stored in the database 1350 as the language specific translations 1354.

A UI coordinate retrieval module 1360 may access UI template coordinate information 1352 and language specific coordinate information 1353 from the database 1350. A second UI 1312 may be generated that may include resized data fields, such as resized field A 1323 and resized field B 1325. The resized fields 1323, 1325 may be resized according to the coordinate information 1352, 1353 stored in the database 1350. As previously explained, UI template coordinate information 1352 may indicate a standard increase or decrease in a data field depending on a particular language. For example, if text strings are translated into a Western European language, the UI template coordinate information 1352 may indicate that each data field should be resized by increasing each data field a certain amount. Following the example, resized field A 1323 may be increased to include translated string A 1340 and resized field B 1325 may be increased to include translated string B 1341.

In some embodiments, certain translated strings may still not fit within a resized data field. For example, string A 1316 and string B 1317 may be translated into Italian and translated string A 1340 (in the Italian language) may include too many characters to fit properly in resized field A 1323 (which was initially resized based on UI template coordinate information 1352 for Western European languages). In one embodiment, the UI coordinate retrieval module 1360 may resize field A according to language specific coordinate information 1353. In this example, resized field A 1323 may be resized according language specific coordinate information 1353. In one embodiment, resized field B 1325 may still be resized according to the UI template coordinate information 1352 because translated string B 1341 (in the Italian language) may still fit properly within resized field B 1325. In other words, the UI template coordinate information 1352 may be initially applied across a set of languages (e.g., Western Europe languages, Eastern Europe languages, etc.) and one or more data fields (or controls) may be disconnected from the UI template coordinate information and the disconnected data field may be resized according to the language specific coordinate information 1353.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of" In addition, for ease of use, the words "including" and "having," as used in the specification and claims, are interchangeable with and have the same meaning as the word "comprising."

What is claimed is:

1. A method for managing coordinate geometry information for a user interface template to be applied to multiple languages, the method comprising:
translating strings of text in a file from a first language to a pseudo language;
analyzing data field sizes associated with a first user interface, wherein the first user interface is in the first language;
resizing the data fields to match strings of text sizes in the pseudo language if the data field sizes do not match the strings of text sizes in the pseudo language;
storing a user interface template with data field geometry information that indicates the data field sizes for strings of text in the pseudo language and data field geometry information for a specific language that indicates the data field sizes for strings of text in the specific language; and
generating a user interface for the specific language from the stored user interface template.

2. The method of claim 1, wherein the pseudo language is associated with one or more languages in a particular region.

3. The method of claim 1, further comprising inserting an indicator at the beginning and end of each string of text in the pseudo language.

4. The method of clam 1, further comprising replacing characters of the strings of text in the first language with characters associated with one or more languages in a particular region.

5. The method of claim 1, further comprising associating the stored user interface template with a particular region.

6. The method of claim 1, further comprising translating strings of text of a file from the first language into a second language.

7. The method of claim 6, further comprising accessing a stored user interface template associated with the second language, wherein the user interface template comprises data field geometry information indicating the data field sizes in the user interface template.

8. The method of claim 7, further comprising creating a user interface in the second language from the user interface template, wherein the user interface in the second language comprises data fields that are sized according to the data field geometry information.

9. The method of claim 8, further comprising inserting the strings of text in the second language into the data fields of the user interface in the second language.

10. The method of claim 8, further comprising disconnecting one or more data fields in the user interface in the second language, wherein the disconnected data fields are resized according to the data field geometry information for a specific language.

11. A computer system configured to manage coordinate geometry information for a user interface template to be applied to multiple languages, the computer system comprising:
a processor;
memory in electronic communication with the processor; and
a mock translating module configured to translate strings of text in a file from a first language to a pseudo language;
an analysis module configured to analyze data field sizes associated with a first user interface, wherein the first user interface is in the first language;
a resizing module configured to resize the data fields to match strings of text sizes in the pseudo language if the data field sizes do not match the strings of text sizes in the pseudo language;
a database configured to store a user interface template with data field geometry information that indicates the data field sizes for strings of text in the pseudo language and data field geometry information for a specific language that indicates the data field sizes for strings of text in the specific language; and
a retrieval module configured to generate a user interface for the specific language from the stored user interface template.

12. The computer system of claim 11, wherein the pseudo language is associated with one or more languages in a particular region.

13. The computer system of claim 11, wherein the resizing module is further configured to insert an indicator at the beginning and end of each string of text in the pseudo language.

14. The computer system of clam 11, wherein the mock translation module is further configured to replace characters of the strings of text in the first language with characters associated with one or more languages in a particular region.

15. The computer system of claim 11, wherein the resizing module is further configured to associate the stored user interface template with a particular region.

16. The computer system of claim 11, further comprising a translation module configured to translate strings of text of a file from the first language into a second language.

17. The computer system of claim 16, further comprising a user interface generation module configured to access a stored user interface template associated with the second language, wherein the user interface template comprises data field geometry information indicating the data field sizes in the user interface template.

18. The computer system of claim 17, wherein the user interface generation module is further configured to create a user interface in the second language from the user interface template, wherein the user interface in the second language comprises data fields that are sized according to the data field geometry information.

19. The computer system of claim 18, wherein the user interface generation module is further configured to insert the strings of text in the second language into the data fields of the user interface in the second language.

20. A computer-program product for managing coordinate geometry information for a user interface template to be applied to multiple languages, the computer-program product comprising a non-transitory computer-readable storage medium having instructions thereon, the instructions comprising:
code programmed to translate strings of text in a file from a first language to a pseudo language;
code programmed to analyze data field sizes associated with a first user interface, wherein the first user interface is in the first language;
code programmed to resize the data fields to match strings of text sizes in the pseudo language if the data field sizes do not match the strings of text sizes in the pseudo language;
code programmed to store a user interface template with data field geometry information that indicates the data field sizes for strings of text in the pseudo language and data field geometry information for a specific language that indicates the data field sizes for strings of text in the specific language; and
code programmed to generate a user interface for the specific language from the stored user interface template.

* * * * *